United States Patent
Kawczynski et al.

(10) Patent No.: US 12,387,320 B2
(45) Date of Patent: Aug. 12, 2025

(54) DEEP NEURAL NETWORK FRAMEWORK FOR PROCESSING OCT IMAGES TO PREDICT TREATMENT INTENSITY

(71) Applicant: Genentech, Inc., South San Francisco, CA (US)

(72) Inventors: Michael Gregg Kawczynski, San Francisco, CA (US); Jeffrey R. Willis, San Francisco, CA (US); Nils Gustav Thomas Bengtsson, South San Francisco, CA (US); Jian Dai, South San Francisco, CA (US); Simon Shang Gao, San Francisco, CA (US)

(73) Assignee: Genentech, Inc., South San Francisco, CA (US)

( * ) Notice: Subject to any disclaimer, the term of this patent is extended or adjusted under 35 U.S.C. 154(b) by 385 days.

(21) Appl. No.: 17/782,497

(22) PCT Filed: Dec. 4, 2020

(86) PCT No.: PCT/US2020/063365
§ 371 (c)(1),
(2) Date: Jun. 3, 2022

(87) PCT Pub. No.: WO2021/113674
PCT Pub. Date: Jun. 10, 2021

(65) Prior Publication Data
US 2023/0025980 A1    Jan. 26, 2023

Related U.S. Application Data

(60) Provisional application No. 63/017,898, filed on Apr. 30, 2020, provisional application No. 62/944,815, filed on Dec. 6, 2019.

(51) Int. Cl.
*G06V 10/82*        (2022.01)
*G06T 3/067*        (2024.01)
(Continued)

(52) U.S. Cl.
CPC ............ *G06T 7/0012* (2013.01); *G06T 3/067* (2024.01); *G06T 7/187* (2017.01);
(Continued)

(58) Field of Classification Search
CPC . G06T 2207/10101; G06T 2207/20081; G06T 2207/20084; G06T 2207/20132;
(Continued)

(56) References Cited

U.S. PATENT DOCUMENTS 12,051,196 B2 * 7/2024 Vaghefi Rezaei ..... G06T 7/0012
2019/0180441 A1 * 6/2019 Peng .................... G06T 7/0016
(Continued)

FOREIGN PATENT DOCUMENTS

CN        110415216 A      11/2019
JP      2013-27439 A       2/2013
(Continued)

OTHER PUBLICATIONS

Bogunović, H. et al. (Jun. 28, 2017). "Prediction of Anti-VEGF Treatment Requirements in Neovascular AMD Using a Machine Learning Approach," Invest. Ophthahnol V/S Sci. 58(7):3240-3248.
(Continued)

*Primary Examiner* — Ian L Lemieux
(74) *Attorney, Agent, or Firm* — Haynes and Boone, LLP

(57) ABSTRACT

Systems and methods relate to processing optical tomography coherence (OCT) images to predict characteristics of a treatment to be administered to effectively treat age-related macular degeneration. The processing can include pre-processing the image by flattening and/or cropping the image and processing the pre-processed image using a neural network. The neural network can include a deep convolutional neural network. An output of the neural network can indicate a predicted frequency and/or interval at which a treatment (e.g., anti-vascular endothelial growth factor
(Continued)

therapy) is to be administered so as to prevent leakage of vasculature in the eye.

18 Claims, 11 Drawing Sheets

(51) Int. Cl.
    *G06T 7/00* (2017.01)
    *G06T 7/187* (2017.01)
(52) U.S. Cl.
    CPC ........... *G06T 2207/10101* (2013.01); *G06T 2207/20081* (2013.01); *G06T 2207/20084* (2013.01); *G06T 2207/30041* (2013.01); *G06T 2210/22* (2013.01)
(58) Field of Classification Search
    CPC ....... G06T 2207/30041; G06T 2210/22; G06T 3/067; G06T 7/0012; G06T 7/0014; G06T 7/187
    See application file for complete search history.

(56) References Cited

U.S. PATENT DOCUMENTS

| | | |
|---|---|---|
| 2019/0313895 A1 | 10/2019 | Hayashi et al. |
| 2020/0074622 A1* | 3/2020 | Yang .................. G06N 3/08 |
| 2020/0372632 A1 | 11/2020 | Chauhan |
| 2023/0157533 A1* | 5/2023 | Chang ................ G16H 50/30 705/2 |
| 2024/0339191 A1* | 10/2024 | Kikuchi ............... A61B 3/0025 |

FOREIGN PATENT DOCUMENTS

| | | |
|---|---|---|
| JP | 2018-121885 A | 8/2018 |
| JP | 2019-528113 A | 10/2019 |
| WO | 2018/035473 A2 | 2/2018 |

OTHER PUBLICATIONS

Dai, J. et al. (Jun. 2020). "Accurately Identify nAMD Patients with Low Anti-VEGF Treatment Need by Deep Learning," Investigative Ophthalmology & Visual Science, ARVO Annual Meeting Abstract, 61:4218, Abstract, 3 pages.

International Preliminary Report on Patentability, issued May 17, 2022, for PCT Application No. PCT/US2020/063365, filed Dec. 4, 2020, 15 pages.

International Search Report and Written Opinion, mailed Mar. 4, 2021, for PCT Application No. PCT/US2020/063365, filed Dec. 4, 2020, 17 pages.

Sahni, J.N. et al. (Aug. 2019). "A Machine Learning Approach to Predict Response to Anti-VEGF Treatment in Patients with neovascular Age-Related Macular Degeneration Using SD-OCT," ARVO Imaging in the Eye Conference Abstract, 60:PB094, 2 pages.

Srinivasan, P.P. et al. (Oct. 1, 2014, e-pub. Sep. 12, 2014). "Fully Automated Detection of Diabetic Macular Edema and Dry Age-Related Macular Degeneration from Optical Coherence Tomography Images," Biomedical Optics Express 5(10):3568, 10 pages.

Office Action mailed Jul. 9, 2024 in related Japanese application No. 2022-533612, original and English translation, 9 pages.

* cited by examiner

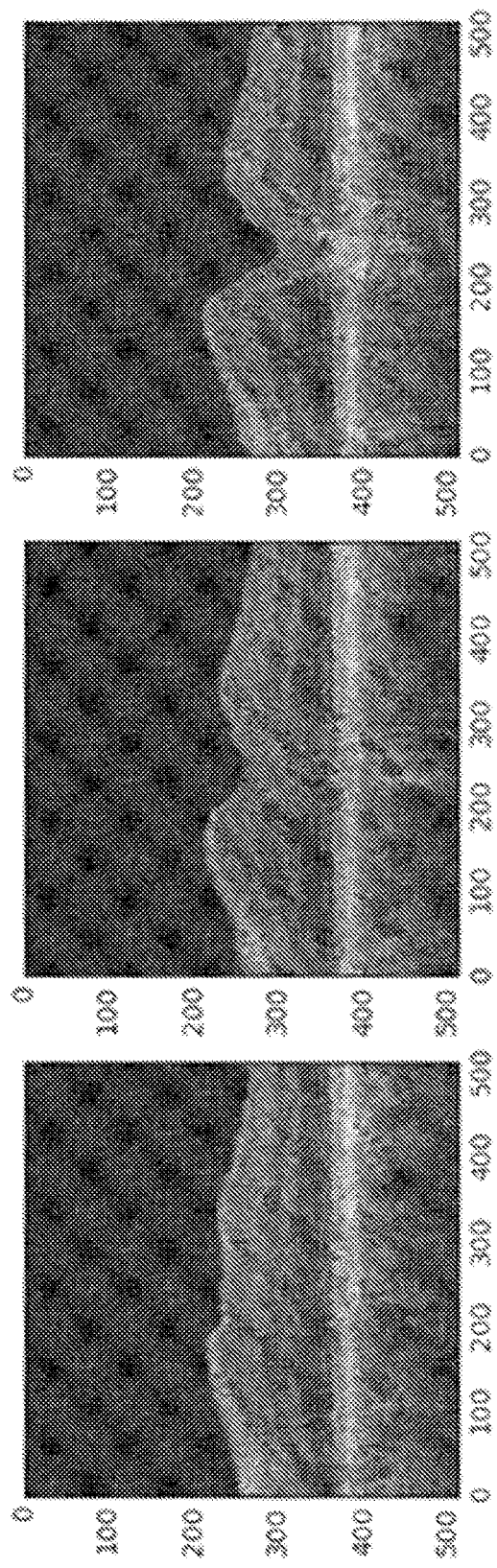

DEEP NEURAL NETWORK FRAMEWORK FOR PROCESSING OCT IMAGES TO PREDICT TREATMENT INTENSITY

CROSS-REFERENCE TO RELATED APPLICATIONS

This is a U.S. national phase application under 35 U.S.C. § 371 of International Application No. PCT/US2020/063365, filed on Dec. 4, 2020, which application claims the benefit of and the priority to U.S. Provisional Application No. 62/944,815, filed on Dec. 6, 2019, and 63/017,898, filed on Apr. 30, 2020. Each of these applications is hereby incorporated by reference in its entirety for all purposes.

BACKGROUND

Age-related macular degeneration (AMD) is the leading cause of vision loss among people older than 60. For most individuals, AMD initially manifests as a dry type of AMD and progresses to a wet type of AMD. For the dry type, small deposits (drusen) form under the macula on the retina, causing the retina to deteriorate in time. For the wet type, abnormal blood vessels grow toward the macula. The vessels frequently break and leak fluid, which can cause the macula to separate from its base, resulting in severe and fast vision loss.

Anti-vascular endothelial growth factor (aVEGF) agents are frequently used to treat the wet type of AMD. Specifically, aVEGF agent can dry out a subject's retina, such that the subject's wet type of AMD can be better controlled, to reduce or prevent permanent vision loss. However, aVEGF agents are administered via intravitreal injection, which is both disfavored by subjects and is accompanied by possible side effects (e.g., red eye, sore eye, infection). Therefore, protocols exist to attempt to identify a minimum effective frequency for aVEGF injections. Many of these techniques are similar to guess-and-check approaches.

One such technique is a treat-and-extend protocol, by which inter-injection intervals are slowly extended so long as no new leakage is observed following a previous inter-injection period. A drawback to this approach is that some subjects will experience new leakage before an injection frequency is raised to a sufficient level.

It would be advantageous for identifying an objective subject-specific approach for determining an aVEGF injection schedule that is sufficient to effectively keep an eye dry while avoiding excessive injections.

SUMMARY

An optical coherence tomography (OCT) image is accessed that corresponds to an eye of a subject experiencing age-related macular degeneration (e.g., wet age-related macular degeneration). Within the OCT image, a set of pixels is identified that correspond to a retina layer. The OCT image is flattened based on the set of pixels. One or more cropping processes are performed using flattened OCT image to produce one or more cropped images. A label corresponding to a characteristic of a proposed treatment schedule for the eye of the subject is generated using the one or more cropped images. The label is output.

The one or more cropped images include can include multiple cropped images, each of the multiple cropped images including a different patch within the flattened OCT image. Generating the label can include, for each cropped image of the one or more cropped images, generating a patch-specific result using a patch-specific neural network. The patch-specific neural network may have been trained with other images of a size that corresponds to the cropped image. Processing the one or more cropped images can further include processing the patch-specific results using an ensemble model.

The label may be indicative of a frequency of treatment administrations (e.g., predicted to be sufficiently effective such that fluid does not leak from vessels in the eye between successive treatment administrations) and/or an interval between successive administrations of a treatment (e.g., predicted to be sufficiently effective such that fluid does not leak from vessels in the eye between successive treatment administrations). The characteristic of the proposed treatment schedule may include a frequency of treatment administrations (e.g., predicted to be sufficiently effective such that fluid does not leak from vessels in the eye between successive treatment administrations) and/or may include an interval between successive administrations of a treatment (e.g., predicted to be sufficiently effective such that fluid does not leak from vessels in the eye between successive treatment administrations).

The neural network can include a deep convolutional neural networks having at least 5 convolutional blocks and having fewer than 10,000 learnable parameters. The retina layer within the retina (e.g., a depiction of which is used for the flattening) may include a retina pigment epithelium layer. The proposed treatment schedule may include a proposed schedule for administering anti-vascular endothelial growth factor. The label may have been generated by inputting the one or more cropped images into a neural network (e.g., that includes one or more convolutional neural networks and/or an ensemble neural network).

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

In some embodiments, a method of treating an eye of a subject experiencing age-related macular degeneration is provided. An OCT image is accessed that depicts at least part of the eye of the subject experiencing age-related macular degeneration (e.g., wet age-related macular degeneration). Processing of the OCT image is initiated using a machine learning model. The processing includes flattening the OCT image and processing at least part of the flattened OCT image using a neural network. A result of the processing of the OCT image is accessed. The result indicates a characteristic of a proposed treatment schedule for the eye of the subject. The eye of the subject is treated in accordance with the proposed treatment schedule. Treating the eye of the subject in accordance with the proposed treatment schedule may include administering an anti-vascular endothelial growth factor to the eye in accordance with the proposed treatment schedule:

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification, and variation of the concepts herein disclosed may be resorted to by those skilled in the art, and that such modifications and variations are considered to be within the scope of this invention as defined by the appended claims.

BRIEF DESCRIPTION OF THE DRAWINGS

The present disclosure is described in conjunction with the appended figures:

Figure (FIG. 1 shows a block diagram of a network for collecting and analyzing optical coherence tomography (OCT) images to predict a treatment-administration schedule effective for treating an eye disorder corresponding to some embodiments.

FIGS. 3A, 3B and 3C illustrate multiple 2-dimensional OCT images associated with different depths of an eye of a subject.

Figure 1:
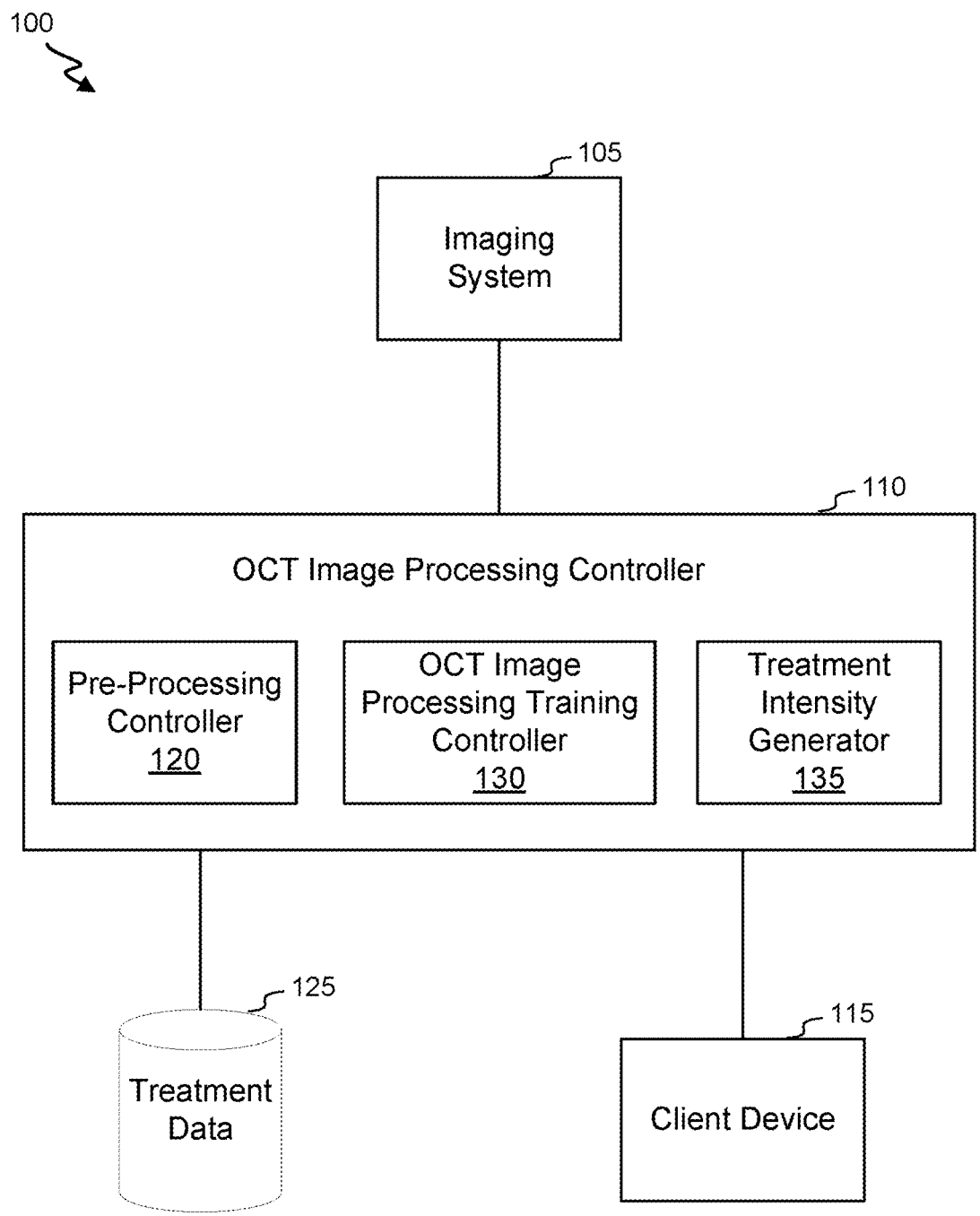

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

I. Overview

This description relates to predicting characteristics of a treatment schedule for a given subject and a given eye based on processing of an optical coherence tomography (OCT) image. The treatment schedule may indicate when multiple administrations of anti-vascular endothelial growth factor (aVEGF) are to be administered. An aVEGF agent may include (for example) ranibizumab or bevacizumab. The aVEGF treatment characteristic may indicate (for example) a frequency of treatment administrations, one or more time periods between successive treatment administrations, or a number of times a treatment is to be administered within a given time period. In some instances, the aVEGF treatment characteristics alternatively or additionally identifies a dosage of an active ingredient to be administered.

The given eye may have been determined to have had (e.g., may have been diagnosed with) macular degeneration, such as age-related macular degeneration and/or wet age-related macular degeneration.

In one embodiment, the OCT image is pre-processed to flatten the image based on a depiction of a particular biological structure, such as the retinal pigment epithelium. The pre-processing further includes cropping the flattened image to exclude portions of the image relatively far from the straightened retinal pigment epithelium depiction.

The pre-processed image is then input into a trained neural network (e.g., a deep neural network and/or convolutional neural network), which generates a label corresponding to a treatment schedule predicted to be effective for the eye (e.g., for treating age-related macular degeneration of the eye, such as wet age-related macular degeneration). More specifically, the label may indicate a characteristic of a treatment schedule predicted to be effective to prevent vessel leakage between successive administrations of a therapeutic (e.g., successive aVEGF injections).

The label may include one or more numbers (e.g., identifying a proposed frequency of treatment administrations, count of treatment administrations proposed for a predefined time period, or a proposed interval between successive treatment administrations), one or more categories (e.g., "low"; "moderate"; or "high" frequency identifiers) and/or one or more binary indicators ("low" or "not low" frequency identifiers). For example, a "low" label may predict that a count of treatment administrations or frequency that is equal to (or potentially even below) a predefined threshold or value will be effective to prevent leakage between treatment administrations for a given subject's eye. As another example, a "high" label may indicate that leakage between treatment administrations is predicted occur for a given subject's eye unless a high treatment (e.g., defined using a treatment-administration count or frequency threshold or value) is used. The thresholds may be defined as absolute values and a time period (e.g., such that a low label is to be assigned if 5 or fewer treatments are administered over a 20-month period; a high label is to be assigned if 15 or more treatments are administered over a 20-month period; and a moderate label is to be assigned if between 6 and 14 treatments are administered over a 20-month period). In some instances, the labels are defined using thresholds for a frequency of treatment administrations (e.g., such that "low" label is assigned if, on average, treatments are administered at a rate of less than once every three months; and a "high" label is assigned if, on average, treatments are administered at a rate of at least once each month).

Each label may be produced via an activation layer in the neural network.

In some instances, a set of treatment-administration schedules is defined. For example, a first schedule may indicate that dosages are to be delivered at 1 month, 2 months, 4 months, 6 months, 9 months, and 12 months from a baseline time; and a second schedule may indicate that dosages are to be delivered at 1 month, 2 months, 3 months, 4.5 months, 6 months, 8 months, 10 months, and 12 months. A label may then identify a particular one of the set of treatment-administration schedules.

The label may indicate a characteristic of a schedule of a maintenance treatment that follows administration of an initial (or onboarding) treatment. For example, an initial treatment may be defined to consist of a particular number of treatment administrations administered in accordance with a particular schedule (e.g., monthly administration for three months). The initial treatment may, but need not, use a same type of therapeutic and a same particular schedule across subjects. The maintenance treatment may, but need not, use a therapeutic that is the same or that is different from the therapeutic used in the initial treatment.

The neural network may include a deep network that may include multiple convolutional blocks (e.g., 10 convolutional blocks), which may exponentially increase expressiveness of the network. The neural network may further or alternatively be thin (e.g., having fewer than 6,000 learnable parameters), which can enable the network to be trained with relatively few computational resources and quickly (e.g., less than one minute per epoch). The neural network can include a fully convolutional neural network that is invariant to input spatial size.

The neural network can be trained using a set of patches of pre-processed training OCT images. Data augmentation may be performed by extracting multiple patches (e.g., of different sizes and/or different relative locations) from a single OCT image. In some instances, a single neural network (e.g., a flexible CNN) is trained using patches of different sizes. In some instances, each of multiple neural networks is associated with a given patch size and/or a given relative patch location and is trained using images of the given patch size and/or of the given relative patch location. The neural network can include an ensemble model that is constructed and trained to aggregate and process results from multiple patch-size-specific neural networks. A cross-validation technique can be used while training the neural network. For example, the cross-validation technique can include a 5-fold cross-validation or a Monte Carlo cross-validation, which may have advantages in being scalable, fault tolerant, poolable, and supportive of distributed model training, selection, and/or evaluation.

A label that identifies a treatment-schedule characteristic may be output and availed to a care provider. In some instances, an output may indicate (or otherwise represent) that an identified treatment-schedule characteristic is one to be potentially associated with a maintenance-treatment period. The care provider may use the label to inform a selection of a treatment approach For example, the care provider may recommend and/or prescribe a treatment (e.g., aVEGF) having a schedule with the treatment-schedule characteristic indicated by the label.

II. Definition

As used herein, "effective" treatment of AMD may include a scenario in which a treatment (e.g., administered in accordance with a particular treatment schedule) for which either no new blood-vessel leakage is observed between administered dosages or no deterioration of visual acuity is observed. In some instances, an effective treatment includes a minimum effective treatment. For example, it will be appreciated that multiple treatment schedules may be effective at treating AMD, in which case a minimum effective treatment can use a treatment schedule that includes (for example) a fewest quantity of treatment administrations over a time period, a lowest frequency of treatment administrations over a time period, a longest average duration between successive treatment administrations, a lowest, total dosage of treatments administered over a time period.

As used herein, a treatment "schedule" indicates when each of multiple dosages of a particular treatment are to be administered. A treatment schedule may identify (for example) a set of dates, one or more inter-dosage time periods, or an administration frequency. For example, a treatment schedule may indicate that a particular treatment is to be administered one time per month. In some instances, a treatment schedule includes one or more ranges. For example, a treatment schedule may identify an administration interval indicating that each of one or more treatment dosages is to be administered sometime between 7-9 weeks from a previous treatment administration.

III. Network for Generating Treatment-Schedule Labels Using OCT Images

Figure (FIG. 1 shows a block diagram of a network 100 for collecting and analyzing optical coherence tomography (OCT) images to predict a treatment-administration schedule effective for treating an eye disorder in accordance with some embodiments of the invention. Network 100 includes one or more imaging systems 105 configured to collect one or more images, each depicting at least part of an eye of a subject.

Imaging system 105 may be configured to collect an optical coherence tomography (OCT) image using an OCT imaging technique. OCT is a non-invasive technique that uses light waves to construct a cross-sectional image of an eye. Imaging system 105 can include an interferometer (e.g., that can include a light source beam splitter and reference mirror). For example, a light source can generate a light beam (e.g., a low-coherence near-infrared light beam), which can be split by a beam splitter. A first portion of the split light beam may be directed to the eye of the subject, and a second portion of the split light beam may be directed to a reference mirror. Backscattered light from the eye and from the reference mirror can be combined, and the combined light can be analyzed to measure interference. Areas of the target tissue that reflect more light can result in more interference.

Each scan can be generated by laterally guiding the light beam to produce interference information associated with multiple positions. Each of a set of A-scans can then be defined to correspond with a particular scan-associated depth. Each A-scan can be a one-dimensional scan. The set of A-scans (e.g., 128, 256, or 512 A-scans) can then be aligned with each other to produce a two-dimensional B-scan.

A B-scan can depict (for example) at least part of the retina, macula and/or optic nerve. Thicknesses between particular layers in the eye and/or shapes between various layers can be indicative of whether blood vessels have ruptured and leaked into the eye (e.g., retinal, subretinal, or subpigment epithelial spaces).

Imaging system 105 may further include one or more processors and/or one or more memories to avail computational actions. For example, the computational actions may include generating a B-scan using multiple A-scans, normalizing intensity values, changing a resolution, and/or applying one or more filters. It will be appreciated that multiple B-scans may be generated for a given eye (e.g., based on multiple sets of A-scans). Each of the multiple B-scans may be associated with a different depth.

Imaging system 105 may transmit and/or otherwise avail images to a OCT image processing controller 110. For example, imaging system 105 may upload the images in association with one or more identifiers to a remote data store, which may be accessible—in part or in its entirety to OCT image processing controller 110. As another example, imaging system 105 may transmit one or more images of an eye to a client system 115, which may then transmit or avail the image(s) to OCT image processing controller 110. Client system 115 may be a computing system associated with a care provider (e.g., physician, hospital, ophthalmologist, medical technician, etc.) that is providing care to a subject whose eye has been imaged at imaging system 105.

OCT image processing controller 110 can include a pre-processing controller 120 configured to pre-process the images (e.g., one or more B-scans). Pre-processing may be performed to mitigate various types of machine- and/or environment-induced variation in the images. For example, pre-processing may include changing a resolution of an image, changing a zoom of an image, and/or changing an intensity distribution of an image (e.g., by applying a normalization or standardization technique).

Due to the natural curvature of the eye, B-scans may depict curved layers. Thus, pre-processing can include flattening an image. Flattening the image can include initial estimating the location of a depiction of a given structure. The location can be defined as a set of pixels. The structure can include the retinal pigment epithelium.

Detecting the structure can include performing a segmentation. Detecting the structure can alternatively or additionally include applying a filter (e.g., a Gaussian filter) to denoise the image. Then, within each column, one or more pixels that are associated with the highest intensity across the column may be preliminarily identified as corresponding to the structure. A smoothing function may be used to promote selecting rather continuous pixels across columns. The flattening may then be implemented by shifting columns relative to each other such that the selected pixels (e.g., associated with the highest intensities) are aligned in a row.

In some instances, the flattening can include segmenting the biological structure (e.g., by applying a filter and then thresholding the filtered image) and then fitting a function to the segmented pixels. The function may include a spline function. Columns of the image may be shifted relative to each other to flatten the spline function.

The pre-processing can include cropping part of the flattened image. The cropping may be performed to produce an image of a target size. The cropping may be performed to remove a top portion of the image and/or a bottom portion of the image. For example, the cropping may be performed to remove all pixels that are above the flattened biological structure by more than a first threshold and/or that are below the flattened biological structure by more than a second threshold. In some instances, a pixel-intensity modification (e.g., normalization, or standardization) is performed subsequent to the flattening.

At least some of the images can be used to train a neural network, along with corresponding labels. Corresponding labels may indicate one or more characteristics of treatment administered across a time period following collection of the image. That is, for each image in a training data set, a date on which it was collected can be defined as a baseline time. A time period over which treatment is characterized may begin at (for example) the baseline time, a month after the baseline time, two months after the baseline time, or three months after the baseline time. In some instances, an initial treatment is initiated shortly after or shortly before the baseline time, and the time period monitored is defined to begin following a completion of the initial treatment.

A treatment data store 125 may include information used to determine the labels or may include the labels themselves. For example, treatment data store 125 may include, for each of a set of subjects, a record that includes an identifier associated with a subject or image and that also includes observed treatment information. The observed treatment information may identify a type of treatment administered, dates on which the treatment was administered, intervals between treatment administration, and/or a quantity of treatments administered over the time period.

OCT image processing controller 110 can include an OCT image processing training controller 130, which can access training data that includes baseline images and corresponding treatment label data. In some instances, OCT image processing training controller 130 may generate a label to associate with each training-data baseline image. The label can be generated based on treatment data (e.g., from treatment data store 125) that corresponds to an identifier associated with the baseline image. For example, the label may identify a quantity of treatments (e.g., of a particular type) administered over a monitored time period (e.g., by querying for treatment-administration dates within a corresponding time period and associated with an identifier corresponding to the baseline image). As another example, the label may identify an interval between the last two treatment administrations or an average (or median) interval between multiple successive pairs of treatment administrations. It will be appreciated that, in some instances, treatment data store 125 stores the labels themselves.

OCT image processing training controller 130 can use the pre-processed images and the labels associated with a training data set to train one or more neural networks. The neural network(s) can include one or more deep neural networks and/or one or more convolutional neural networks. Each of the neural network(s) may be configured to include at least 1, at least 2, at least 5, at least 10, at least 15, or at least 20 convolutional blocks. Each of the one or more deep convolutional neural networks can be a thin neural network with fewer than 20,000 learnable parameters, fewer than 10,000 learnable parameters, fewer than 6,000 learnable parameters, or fewer than 3,000 learnable parameters.

In some instances, the neural network(s) may include multiple neural networks—each trained to process images of different sizes and/or each trained to process patches corresponding to different locations. Thus, in some instances, initial pre-processing is performed at an image level (e.g., to flatten and crop the image). Subsequent pre-processing may be performed to prepare an input for a particular neural network by (for example) extracting a particular patch from the flattened and cropped image, where the size and the location of the patch are determined based on metadata associated with the particular neural network For example, the multiple neural networks may include a first set of neural networks trained to process patches with a 128×128 pixels; a second set of neural networks trained to process patches with 256×256 pixels; a third set of neural networks trained to process patches with 512×512 pixels; a fourth set of neural networks trained to process patches of 1024×1024 pixels; and another neural network (low-level image-based network) trained to process the entire image. Each of a given set (e.g., the first set, the second set, etc.) of neural networks may be associated with a given location of an image region, where the regions associated with the first set may tile the image region in an overlapping or non-overlapping manner.

The outputs from the multiple neural network may be input to yet another neural network (e.g., a committee machine) that can integrate the results, such that the neural networks collectively serve as an ensemble model. For example, the other neural network can be configured to learn weights to be applied to outputs of various neural networks. In some instances, the integrating network learns a single weight to be applied to each output of a given low-level neural network (e.g., associated with a particular patch). In some instances, the integrating network learns more complex relationships, where a weight applied to an output of a given neural network may depend on (for example) the output from the given neural network and/or the output from each of one or more other neural networks. In some instances, each patch-specific neural network is configured to generate both an output and a confidence metric. The integrating network may then (further or alternative) determine a weight to be applied to a given output from a given low-level neural network based at least in part on the confidence metric from the given low-level neural network and/or on the confidence metric(s) from one or more other low-level neural networks.

OCT image processing training controller 130 may be configured to collectively train all of the neural networks (e.g., all of the patch-specific neural networks and the other integrating neural network). Alternatively, OCT image processing training controller 130 may individually train each patch-specific network, the low-level image-based network and the other integrating network. In some instances, independent training is performed to initialize parameters in each model, and then collective training is performed.

OCT image processing controller 110 can include a treatment intensity generator 135 that uses the trained neural networks to generate a result corresponding to an OCT image not included in the training data. The OCT image may correspond to a subject and/or to an eye that was not represented in the training data. The imaged eye may include an eye diagnosed with age-related macular degeneration and/or wet age-related macular degeneration.

The OCT image can include one that has been pre-processed, which can include remote pre-processing (e.g., at an imaging system 105) and/or pre-processing performed at pre-processing controller 120. The pre-processing can include one or more pre-processing techniques disclosed herein, such as generating a B-scan using multiple A-scans, flattening a B-scan image, cropping a flattened image, and/or adjusting (e.g., normalizing or standardizing) intensities.

Treatment intensity generator 135 can then feed the pre-processed OCT image into the trained neural network(s) to generate an output corresponding to a characteristic of a treatment schedule predicted to be effective to treat the eye (e.g., sufficient to prevent the blood vessels from leaking between treatment administrations). In some instances, the output corresponds to a characteristic of a treatment schedule predicted to include a minimal quantity of treatment administrations across a time interval (and/or a longest duration between treatment administrations) that will effectively treat the eye. The output may identify (for example) a quantity of a treatments (e.g., a particular treatment, such as a particular aVEGF treatment) to be administered with a predefined time period; a frequency at which treatments (e.g., of a particular treatment type) are to be administered; an interval (e.g., expressed as a given number with units or as a range) that is to separate successive administrations of treatment. In some instances, treatment intensity generator 135 applies one or more post-processing techniques to transform an output from a neural network to a result. For example, an output may identify a target frequency of treatment administrations, and the post-processing may convert the output into a set of dates (or date ranges) on which treatment is to be administered.

The result can be returned to a client device 115. Client device 115 can be associated with (e.g., owned, used, controlled, and/or operated by) an entity providing medical care to the subject whose eye was at least partly depicted in the analyzed OCT image. For example, the entity may include a physician, physician's office, or ophthalmologist. In some instances, client device 115 initially provided the OCT image to OCT image processing controller 110. In some instances, client device 115 initiated and/or completed a request to imaging system 105 to collect the OCT image.

A result that indicates a characteristic of a treatment schedule predicted to provide effective treatment for the eye may be used by the care-providing entity to inform a selection and/or definition of a treatment schedule to be prescribed and/or recommended for the subject.

Figure 2:
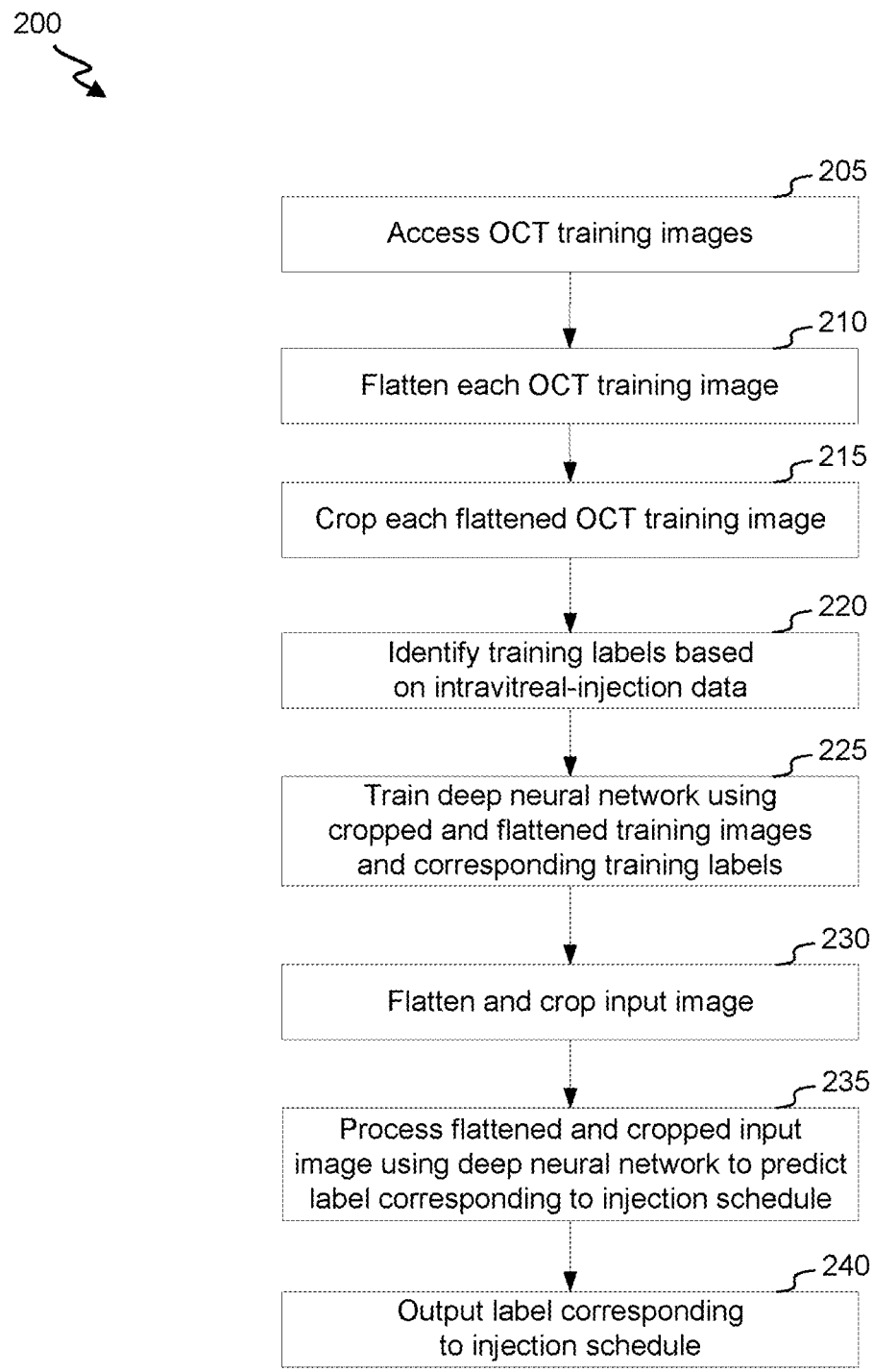
FIG. 2 illustrates a flow chart of an exemplary process for processing OCT images using a deep neural network to generate labels corresponding to a treatment-administration schedule.

IV. Machine-Learning Process for Generating Treatment-Schedule Labels Using OCT Images FIG. 2 illustrates a flow chart of a process 200 for processing OCT images using a deep neural network to generate labels corresponding to a treatment-administration schedule. At block 205, a set of OCT training images are accessed. Each OCT training image may have been collected from an eye and subject having been diagnosed with age-related macular degeneration (e.g., wet age-related macular degeneration). Each OCT training image may further be associated with past data indicating a selection of a treatment schedule (e.g., frequency of aVEGF treatment administrations) and/or treatment result (e.g., indicative of efficacy of a treatment administered in accordance with a particular treatment schedule). Each of the OCT training images may have been associated with data indicating subsequent subject status observed responsive to a treatment regimen associated with a particular treatment (e.g., particular therapeutic).

A training data set can include multiple 2-dimensional images corresponding to a single subject eye. For example, the multiple 2-dimensional images can correspond to different depths.

At block 210, each of the OCT training images is flattened. The flattening can be performed to morph the image such that a depiction of a particular biological structure (e.g., a retinal layer, such as the retinal pigment epithelium layer) is substantially flat in the flattened image. Other portions (e.g., pixels) in the image may be morphed so as to adjust their positions based on the flattening.

Figure 4B:
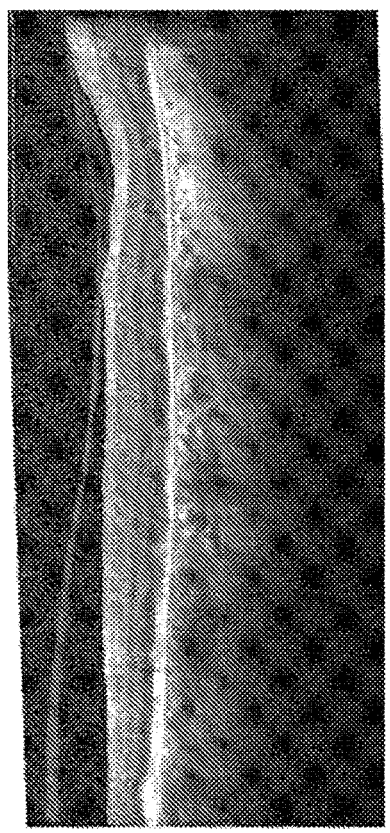
FIGS. 4A and 4B illustrate an unflattened OCT image and a flattened OCT image, respectively.
Figure 4A:
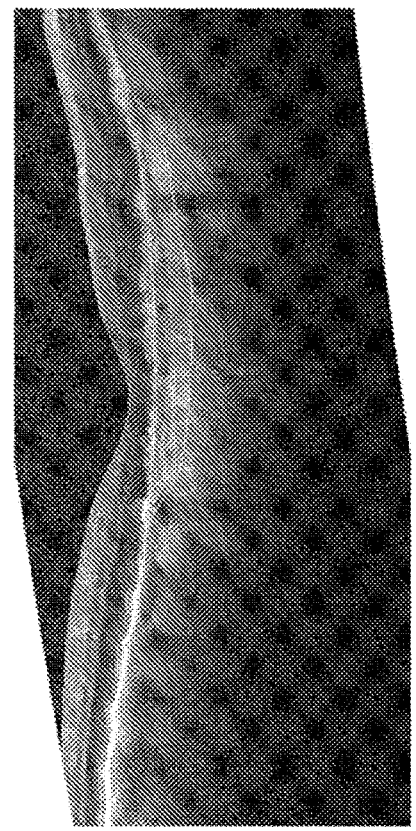

The particular biological structure may be identified based on metadata associated with the image (e.g., that identifies pixels associated with the layer) and/or by performing a computer-vision technique (e.g., to detect and/or characterize edges). In some instances, the biological structure is identified during acquisition of the image and may be detected within an OCT scanner. FIG. 4A illustrates a portion of an unflattened OCT training image, and FIG. 44B illustrates a portion of a flattened OCT training image. It will be appreciated that each individual OCT training image (and each flattened OCT training image) can include a 2-dimensional image. The bottom white layer in each image is the retinal pigment epithelium layer, which served as a basis for the flattening. Thus, one approach for identifying a particular target biological structure is to define a target range (e.g., open or closed range) of intensity values, to detect pixels having intensity values within the range and to then define a lined (e.g., curved line) based on those detected pixels. The flattened OCT image was further cropped to produce the flattened and cropped OCT image shown in FIG. 4B.

At block 215, each flattened OCT training image is cropped. The cropping can be performed to remove a top portion and/or a bottom portion of the flattened image. The portion(s) that are removed may lack a depiction of part of the retina and/or may have an intensity statistic (e.g., mean intensity, median intensity, or intensity variability) that is below a predefined threshold. In some instances, a same or subsequent cropping is performed to generate a patch of the flattened image (e.g., having a width that is less than a minimum or maximum width of the flattened and potentially initially cropped OCT training image). The cropping may be performed so as to produce an image of a predefined size. In some instances, multiple biological landmarks are detected, and cropping is performed so as to scale the training image to a default scale.

For example, each of the images depicted in FIGS. 3A-3C was collected by imaging a single eye using a Zeiss Cirrus machine. Each of FIGS. 3A-3C corresponds to a central B-scan of a different depth. Further, the depicted images include flattened images (with the flattening performed towards the retinal pigment epithelium layer) and cropped images. The cropping was performed to include an area that extends from 128 pixels below the flattened RPE layer to 384 pixels above the flattened RPE layer.

At block 220, for each of the OCT training images, a training label is identified that characterizes treatment administration events (e.g., intravitreal-injection events). The training label may be based on a treatment selected for to treat the eye of the subject (e.g., subsequent to collection of the OCT training image and/or being used at a particular pre-identified time point subsequent to the collection of the OCT training image).

The training label may include a characteristic of the selected treatment or a result of the selected treatment. For example, the training label may identify an agent being used for treatment, a dosage of a particular therapeutic being administered, or a temporal characteristic of treatment administrations (e.g., a frequency or period of medication administrations or an inter-administration time period). As one illustration, the agent may include any aVEGF agent or a particular aVEGF agent. As another example, the training label may identify whether a particular treatment or particular type of treatment (and/or particular dosage of the particular treatment or particular type of treatment) was sufficiently effective such that a particular event was not observed (e.g., that no new blood-vessel leakage was observed) or that a particular event was observed (e.g., elimination of macular fluid secondary to underlying wet type of age-related macular degeneration) or such that a particular event was not observed (e.g., leakage between successive treatment administrations). As an additional or alternative example, the training label may indicate whether a particular schedule of treatment (e.g., which may indicate relative times at which multiple treatments are to be administered and potentially dosages of the multiple treatments) were sufficiently effective such that a particular event was not observed (e.g., that no new blood-vessel leakage was observed) or that a particular event was identified (e.g., elimination of macular fluid secondary to underlying wet type of age-related macular degeneration).

The treatment label may indicate a characteristic of a treatment administered using an approach where an interval between successive treatment administrations is decreased each time leakage is observed or where a treatment is administered following each leakage observation. In some instances, the label can indicate a quantity of treatments administered across a time period (e.g., potentially normalized by a duration of the time period so as to indicate a frequency). The time period may include (for example) a time period from a baseline date and/or from a date following an initial treatment period. The time period may have a defined duration (e.g., with respect to training data).

In some instances, the label may be based partly or entirely based on one or more treatment modifications (or lack thereof). For example, a default treatment regimen may have been selected, and the training label may reflect whether and/or which modifications to the default treatment regimen were used to treat the eye. In some instances, the label identifies a number or frequency of a given type (e.g., and dosages) of treatment that were administered within a given time period.

At block 225, a deep neural network is trained using the cropped and flattened training images and the corresponding training labels. In some instances, block 225 includes training each of one or more deep neural networks using at least some of the cropped and flattened training images and corresponding training labels. For example, a set of deep neural networks may be used, where each of the set of deep neural networks is trained using patches from the cropped and flattened training images of a particular size (e.g., such that different patch sizes are processed by different networks). Each of the set of deep neural networks may have a similar or same architecture but may be trained using different portions of the training data, such that different parameter values are learned by different networks. An ensemble model may be used to aggregate and process results from multiple lower-level patch-size-specific neural networks.

Each of the one or more deep convolutional neural networks may include at least 1, at least 2, at least 5, at least 10, at least 15, or at least 20 convolutional blocks. Each of the one or more deep convolutional neural networks can be a thin neural network with fewer than 20,000 learnable parameters, fewer than 10,000 learnable parameters, fewer than 6,000 learnable parameters, or fewer than 3,000 learnable parameters.

Figure 5:
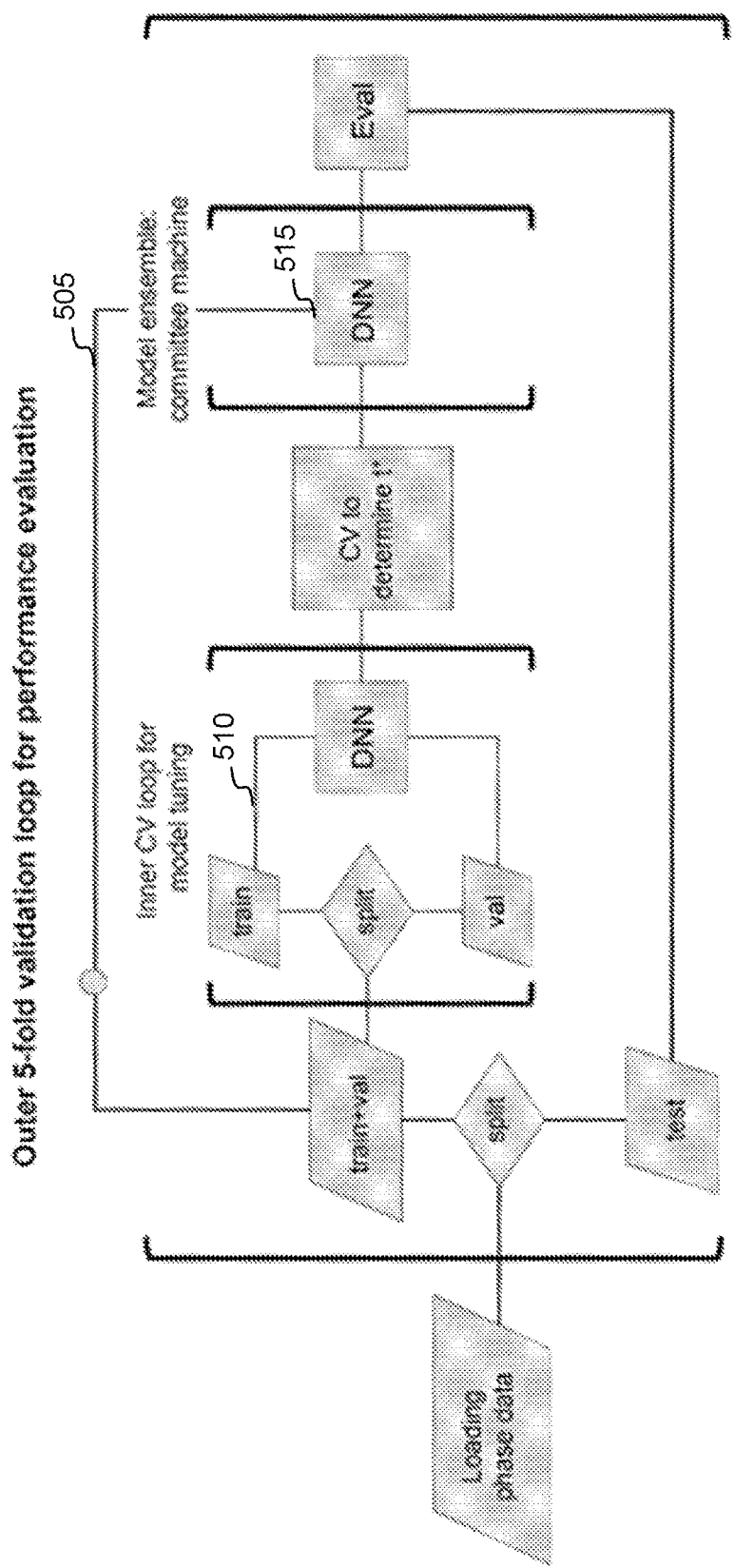
FIG. 5 illustrates a deep-learning pipeline for training and using a deep learning network to process data.

It will be appreciated that, in some instances, a cross-validation technique (e.g., nested cross-validation technique) may be used to select for hyperparameters and/or estimate errors. More specifically, a cross-validation technique may be used in lieu of dividing a training data set into training, validation and testing subsets to estimate a generalization capability. This latter technique may involve developing the model with the training data, selecting an optimal model with the validation data, and evaluating the performance of the selected optimal model with the testing data. Meanwhile, as illustrated in FIG. 5, a nested cross-validation approach can use multiple levels of cross-validation iterations (i.e., an outer loop 505 and an inner loop 510) to implement data splitting and evaluation of the model's generalization capability.

In outer loop 505, the training data can be split into testing data and a combination of training and validation data (e.g., according to the five-fold splitting method). In each iteration, the training and validation data can be further separated in inner loop 510. One or more fully convolutional neural network(s) can be trained using the training data. In some instances, a single fully convolutional neural network is trained using the training data. Each of the fully convolutional neural networks can include a relatively small number of parameters (e.g., less than 10,000 parameters, less than 8,000 parameters, or less than 5000 parameters). The validation data can be used to select hyperparameters (e.g., determine optimal hyperparameters) for the models. In the depicted instance, the validation data is used to determine a particular stopping epoch (e.g., the optimal stopping epoch). With a given split of training and validation data, the particular stopping epoch can be determined by selecting the epoch (across multiple epochs used during training) with the lowest validation loss.

The training and validation splits can be repeatedly performed, such that different portions of the data are assigned to the training data at each iteration. The final particular stopping epoch (t* in the figure) can be a statistic generated based on each split's identified particular stopping epoch (e.g., an average of the particular stopping epochs across splits). The combination of training and validation data can be used to train multiple models with the final particular stopping epoch. Each of the multiple models may have a same architecture but may include different learned parameters as a result of being trained using different orders of training-data elements. These multiple models can form a model ensemble or an ensemble model 515. The ensemble model can be evaluated on the testing data that had been held-out.

At block 230, an input image can be flattened and cropped. The input image can include an OCT image associated with an eye and subject experiencing age-related macular degeneration (e.g., wet age-related macular degeneration). In some instances, the input image includes one not represented in the training data. The flattening may be performed using a same or similar technique as one applied at block 210 to flatten training images. The cropping may be performed using a same or similar technique as one applied at block 215. In some instances, the cropping is performed to potentially remove a top portion and/or a bottom portion that does not depict a region of interest (e.g., a part of the retina). The cropping may, but need not, extend to generate one or more patches of data (e.g., regardless of whether patches were used to train the model).

At block 235, the flattened and cropped input image is processed using the trained deep neural network to generate a label. The label can correspond to a characteristic of a treatment-administration schedule. The label may identify one or more characteristics of a treatment-administration schedule (e.g., associated with administration of an aVEGF agent) predicted to be effective to treat an eye depicted in the input image (e.g., elimination of macular fluid secondary to underlying wet type of age-related macular degeneration) and/or to prevent progression of a condition (e.g., to prevent progression to a wet type of age-related macular degeneration).

The label may alternatively or additionally correspond to a prediction as to whether a treatment-administration schedule (e.g., associated with administration of an aVEGF schedule) will be effective at treating the depicted eye and/or preventing a particular type of progression.

At block 240, the label corresponding to the treatment-administration schedule is output. For example, the label may be presented or transmitted (at or to a device associated with a medical-care provider). The label may be output with other information pertaining to a subject, such as a name of the subject and/or a diagnosis date.

V. Example 1

OCT images collected by imaging retinas diagnosed with age-related macular degeneration were analyzed using deep-learning models to generate eye- and subject-specific predictions as to what type of aVEGF treatment would subsequently be provided to the depicted eye of each subject.

V.A. Methods

1042 OCT images were captured during the loading phase from PRN arms of HARBOR for nAMD. Specifically, study eye OCTs from 352 subjects were assessed and correlated that with their anti-VEGF treatment-administration burden over 23 months. Low anti-VEGF treatment need was defined as having 5 or fewer injections over 21 visits after loading phase and between completion of 3 consecutive monthly ranibizumab treatment administrations and month 23 visit. (See Bogunovic H et al. Prediction of anti-VEGF treatment requirements in neovascular AMD using a machine learning approach. *Invest Ophthalmol Vis Sci.* 2017; 58(7):3240-3248, which is hereby incorporated by reference in its entirety for all purposes.) Stratified 5-folds were created at subject level for nested cross-validation.

OCT images (1024×512×128 resolution) from a Zeiss Cirrus machine were flattened (or re-baselined) towards the flattened retinal pigment epithelium (RPE) layer and cropped with 384 pixels above, 128 below RPE. Central 15 B-scans were selected. Stochastic cropping (e.g., such that a location that is cropped, and potentially a size that is used for cropping, is determined using a stochastic process) was applied to sample training and validation patches of random or pre-specified size.

A deep learning network was designed that included 10 convolution blocks to exponentially increase expressiveness with <5600 weight parameters. The deep learning network included a fully convolutional layer. This design facilitated fast and computationally inexpensive training. F-CNN (fully convolutional neural network) architecture was applied to enable patches of arbitrary size as input, and predict on whole slice. A committee machine was used as an ensemble model. Each committee-member model generated a patch-level prediction, and the committee machine aggregated the patch-level predictions to generate an image-level result (e.g., by determining a mean of the patch-level predictions). The image-level result corresponded to a binary prediction as to whether a particular treatment intensity (e.g., high anti-VEGF treatment, or in other cases, low anti-VEGF treatment, would be administered). Low anti-VEGF treatment was defined as having five or fewer anti-VEGF treatment administrations over a 20-month period between an onboard 3-month period during which ranibizumab was administered monthly and a 23-month visit.

V.B. Results

Among 547 PRN study eyes, 352 unique study eyes were eligible for analysis. Among these, the model predicted that 79 (22.4%) eyes were to be classified as having a disease that would require only low anti-VEGF treatment for effective treatment.

1042 OCT scans from the loading phase were used for modeling. For each scan, the observed treatment was categorized as being low, moderate, or high anti-VEGF treatment, and the predicted treatment was similarly categorized. The model achieved area under the receiver operating curve (AUROC) 78.6% (72.7-84.4%).

V.C. Conclusions

The deep-learning model exhibited strong performance in terms of predicting what type of anti-VEGF treatment individual nAMD subjects would receive (e.g., low, moderate, or high) after a ranibizumab loading phase. These types of results may help physicians/subjects understand future treatment burden. The results may further or alternatively be used to stratify subjects in future clinical studies that aim to assess anti-VEGF treatment-administration durability.

VI. Example 2

Another analysis was performed using a different set of OCT images collected by imaging retinas diagnosed with age-related macular degeneration. Deep-learning models were used to generate eye- and subject-specific predictions as to what type of aVEGF treatment would subsequently be provided to the depicted eye of each subject.

VI.A. Methods

The deep-learning model was trained using 1069 OCT images collected from 362 subjects. This training data was repeatedly split into a first subset used to train the model and a second subset to validate the model. During each of these data partitions, an accuracy of the model's predictions on the validation data was determined. When evaluating predictions generated using the validation subset, average and aggregated statistics (e.g., average AUROC statistics and aggregated AUROC statistics) were then generated by assessing the predictions' accuracy across data splits. A hold-out set (not used for training) included 183 OCT images from 62 subjects. An anti-VEGF treatment-administration burden was assessed using each of two metric frameworks:

First "MUV" framework: Low anti-VEGF treatment need was defined as having 5 or fewer treatment administrations between completion of 3 consecutive monthly ranibizumab injections and month 23 visit. High anti-VEGF treatment was defined as having 16 or more aVEGF treatment administrations between completion of 3 consecutive monthly ranibizumab treatment administrations and month 23 visit.

Second "Turing" framework: Low anti-VEGF treatment need was defined as having 2 or fewer aVEGF treatment administrations between completion of 3 consecutive monthly ranibizumab treatment administrations and month 12 visit. High anti-VEGF treatment was defined as having 9 or more aVEGF treatment administrations between completion of 3 consecutive monthly ranibizumab treatment administrations and month 12 visit.

OCT images were pre-processed using a same type of flattening and cropping protocol as described in Example 1. A deep-learning dense network was designed to be configured as described in Example 1.

VI.B. Results

Figure 6A:
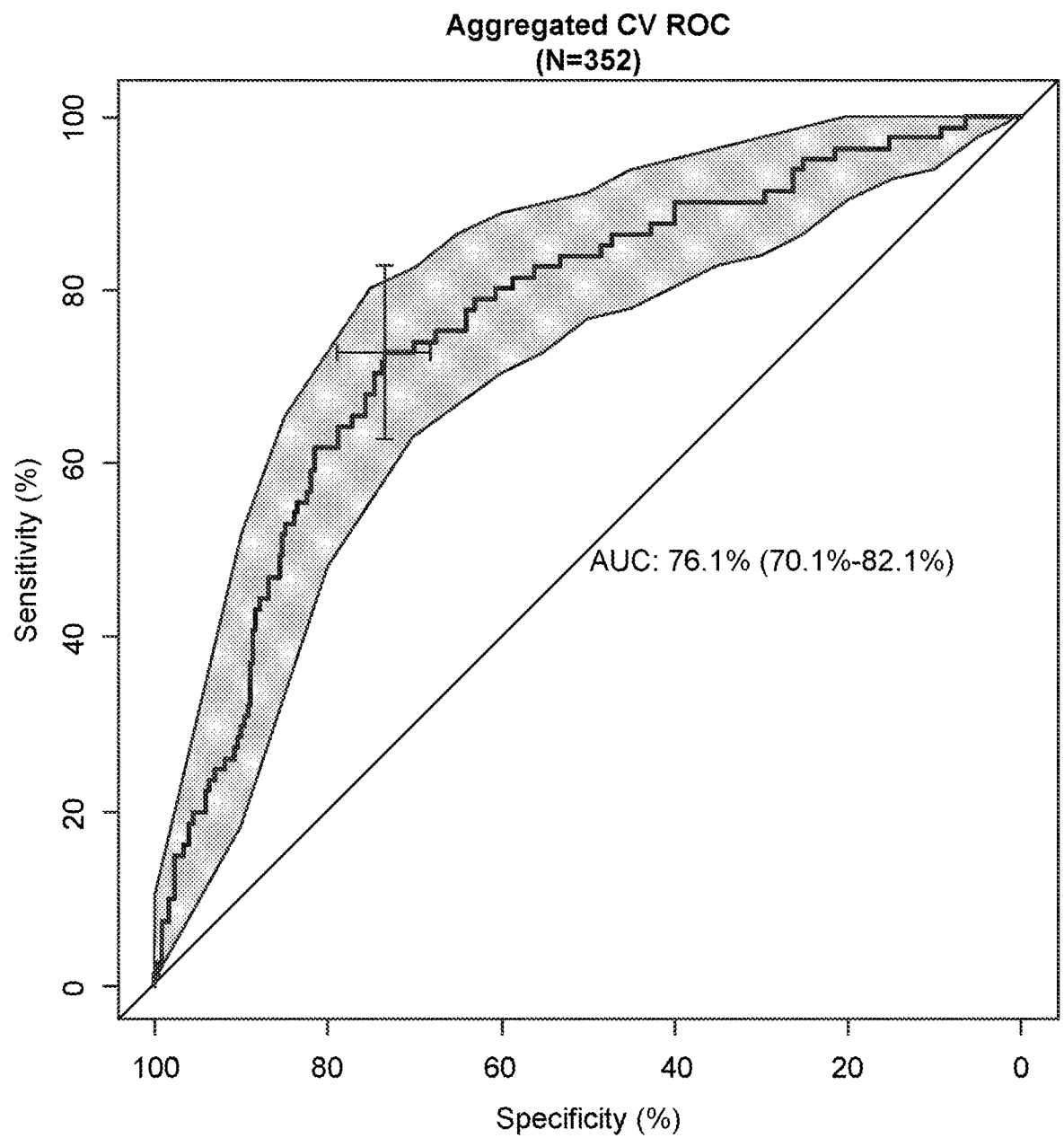
FIGS. 6A and 6B show aggregated receiver operator curves (ROCs) based on labels (associated with a first label framework) generated by a dense neural network predicting whether individual OCT images correspond to an instance for which an associated eye will have high-intensity aVEGF treatment or low-intensity aVEGF treatment, respectively.
Figure 6B:
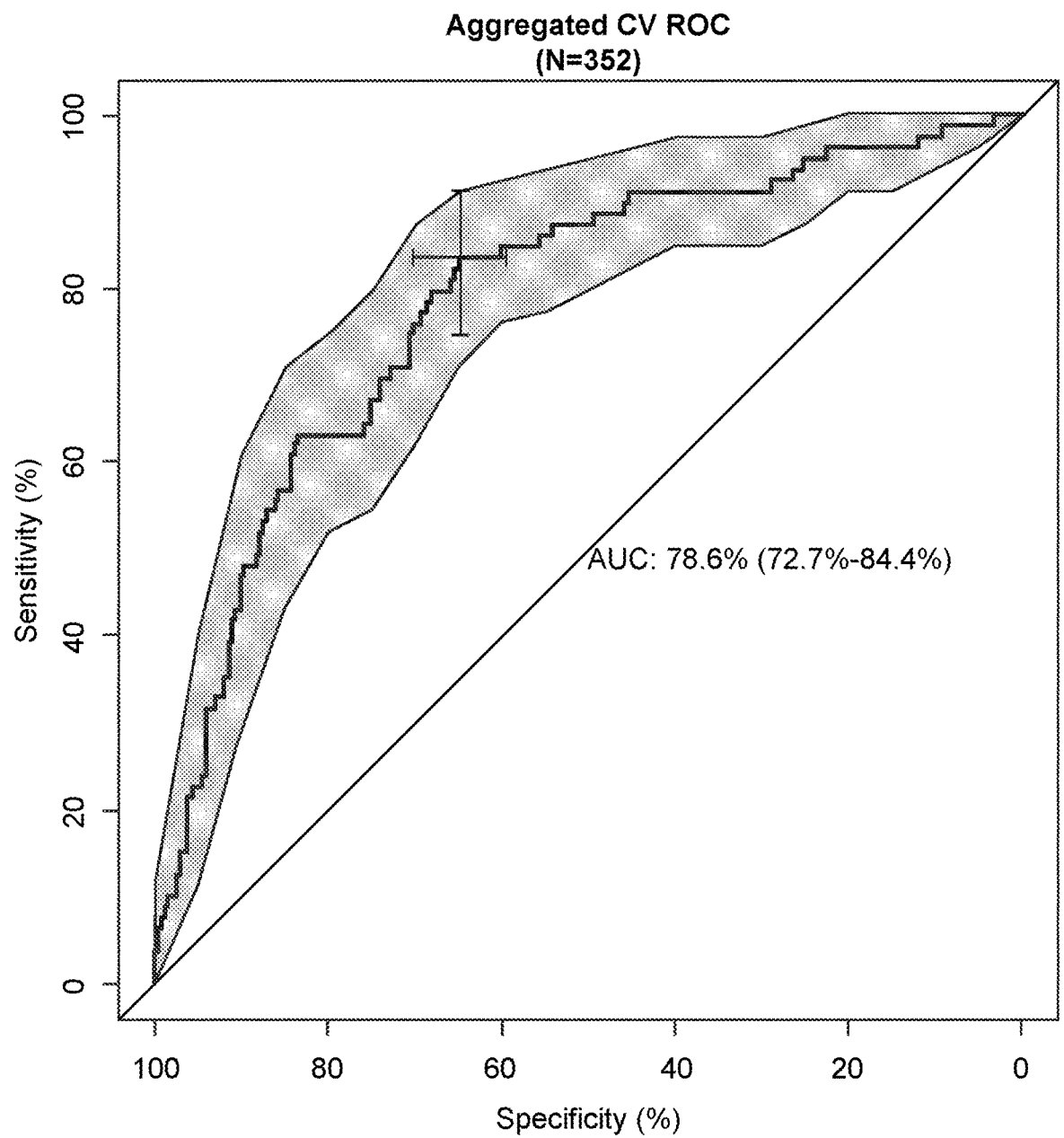

FIGS. 6A-6B show aggregated cross-validation receiver operator curves (ROCs) characterizing the accuracy of predictions of the first MUV-framework labels generated by the dense network. The data represents accuracy characterizations from validation-data assessments. FIG. 6A characterizes the accuracy of predictions as to whether a given eye-subject pair will have a high anti-VEGF treatment. To generate the ROCs, a threshold was varied across a range. For each image (e.g., in a split or hold-out data set) and for each threshold, a prediction was generated as to whether the subject received a particular treatment schedule deemed to be a "positive" instance based on whether a result generated by the deep-learning model was above the threshold. For each data set (e.g., split data set of hold-out data set), a sensitivity metric was calculated as the number of true positives divided by the sum of the true positives and false negatives. Further, for each data set, a specificity metric was calculated as the number of true negatives divided by the sum of true negatives and false positives.

Ideally, the sensitivity and specificity metrics would both near 1.0 (or equal 1.0 for at least one threshold. In this instance, a receiver-operator curve (ROC) that plots the sensitivity versus the specificity across threshold values would include one or more points near or at (100, 100), and the curve would not follow the unity line. One technique for measuring the extent to which the ROC has these properties is to determine the area under the curve. An area under the curve near or at 100% indicates that, for at least one threshold, the model is able to successfully predict positive instances would be used and also to successfully predict negative instances.

FIG. 6A corresponds to an analysis where "positive" instances were defined as instances where a subject received a high-intensity anti-VEGF treatment, and the high-intensity anti-VEGF treatment was defined in accordance with the above-described MUV label definitions. An ROC curve was calculated for each of 10 data splits. FIG. 6A shows the average ROC and the ROC distribution. The average AUROC (calculated by averaging the AUROCs calculated for each of 10 data split) was 0.77, and the aggregated AUROC (calculated by first averaging the data splits' ROCs and then calculating an AUROC using the averaged ROC) was 0.76.

FIG. 6B corresponds to an analysis where "positive" instances were defined as instances where a subject received low-intensity anti-VEGF treatment (as defined by the MUV framework). The depicted plot characterizes accuracy of predictions as to whether a given eye-subject pair will have a low anti-VEGF treatment. The average AUROC was 0.80, and the aggregated AUROC was 0.79.

Figure 6C:
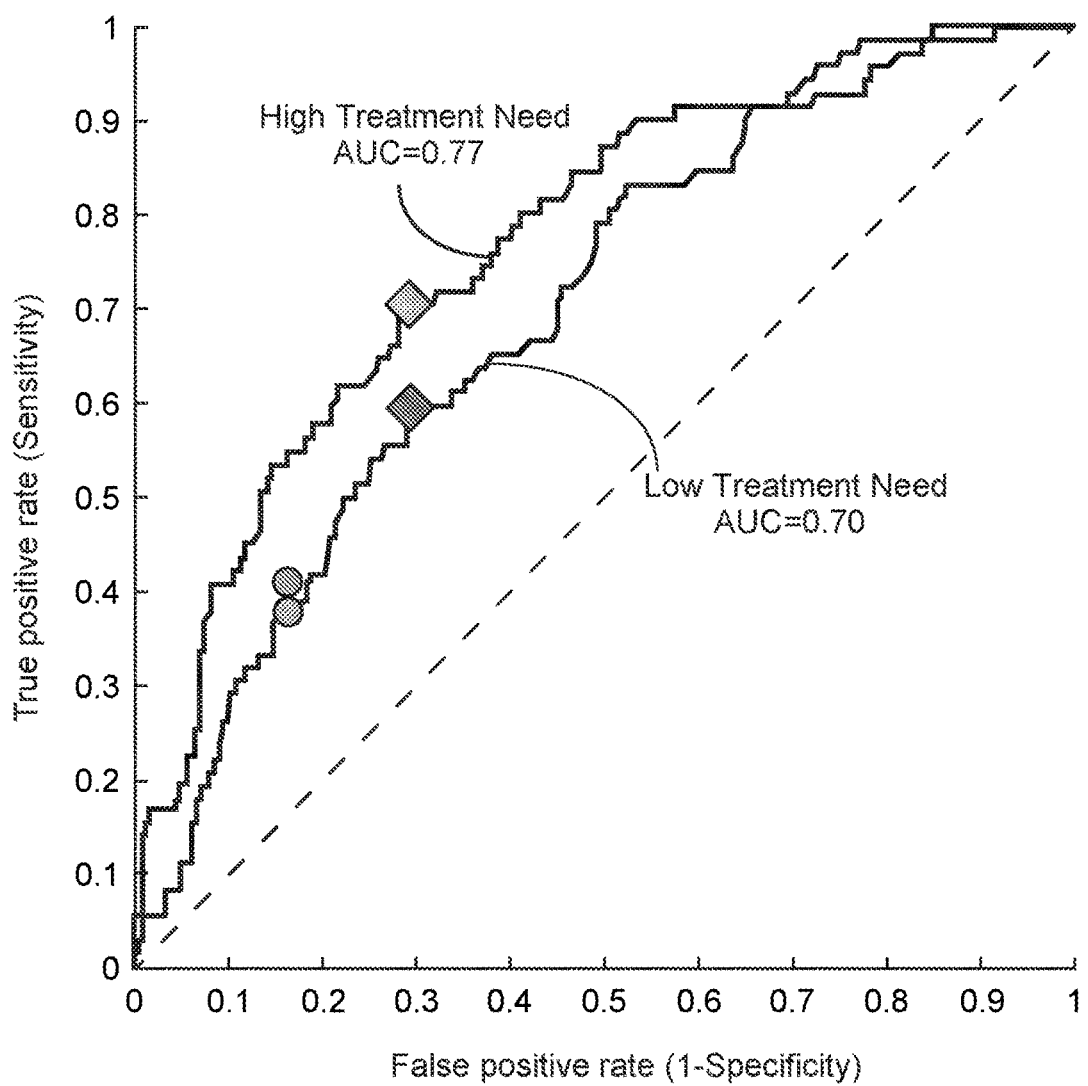
FIG. 6C shows ROCs characterizing the accuracy of treatment-intensity predictions (associated with the first label framework) generated by using a random-forest model to process OCT images.

FIG. 6C shows the receiver operator curves for high and low treatment predictions using a random forest model on extracted features (e.g., where 10-fold cross-validation was used to generate a binary prediction as to whether a particular intensity of treatment was administered). As shown, the AUROC for predicting high and low treatments were 0.77 and 0.70, respectively—both being lower than those corresponding to the predictions from the dense neural network technique (pertaining to the data in FIGS. 6A-6B).

Figure 7A:
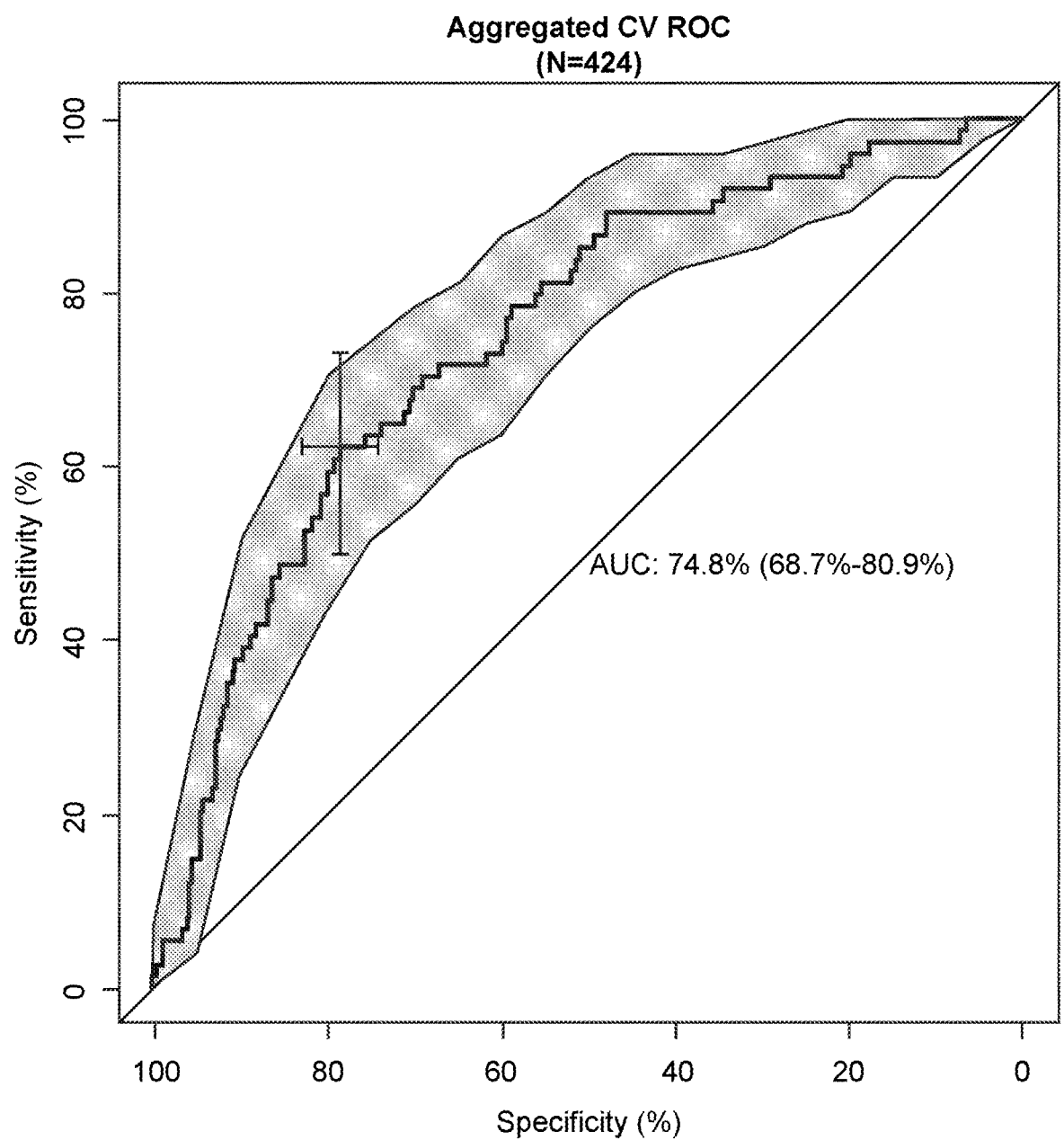
FIGS. 7A and 7B show ROCs based on labels (associated with a second label framework) generated by a dense neural network predicting whether various OCT images correspond to an instance for which an associated eye will have high-intensity aVEGF treatment or low-intensity aVEGF treatment, respectively.
Figure 7B:
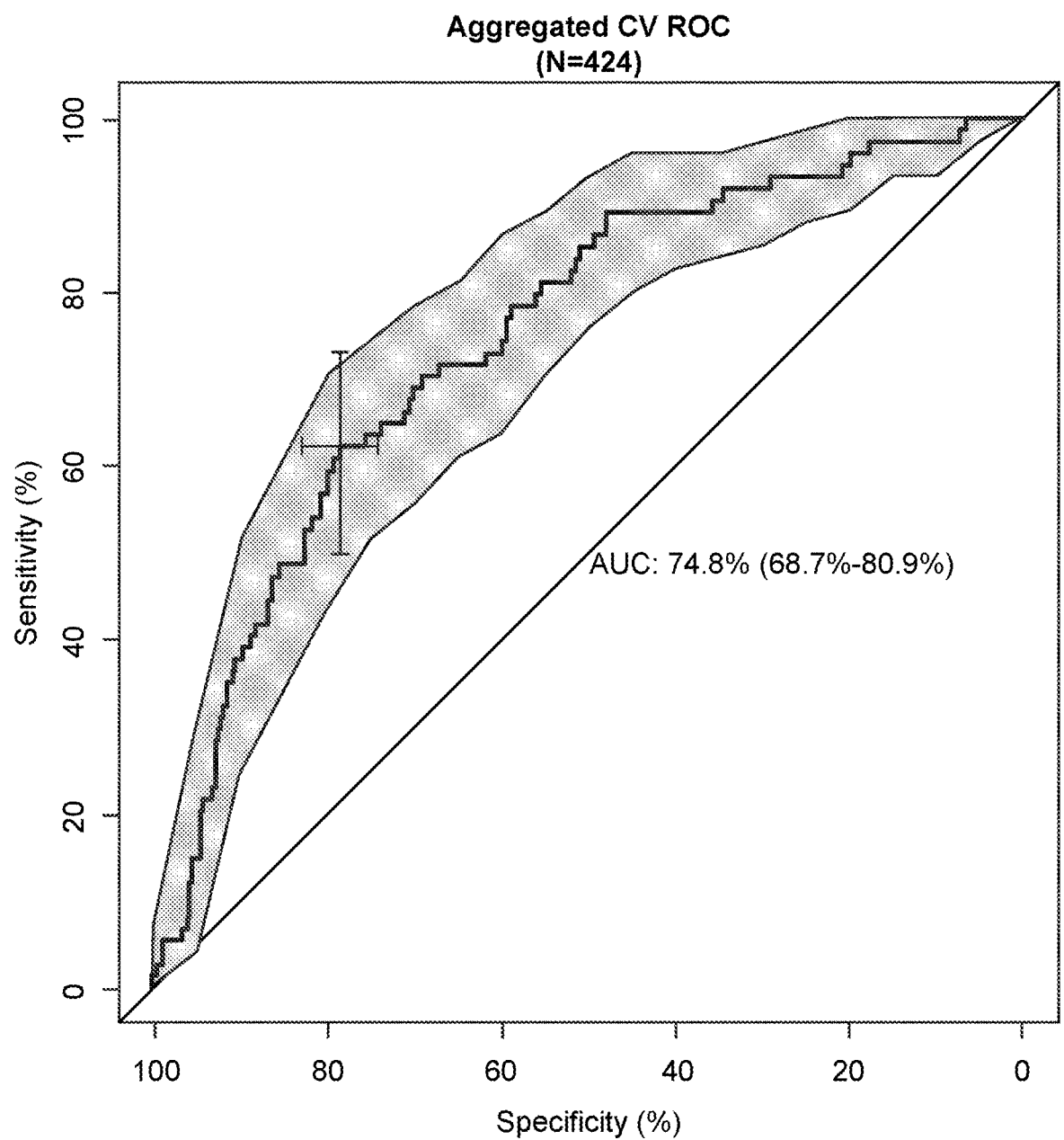
Figure 7C:
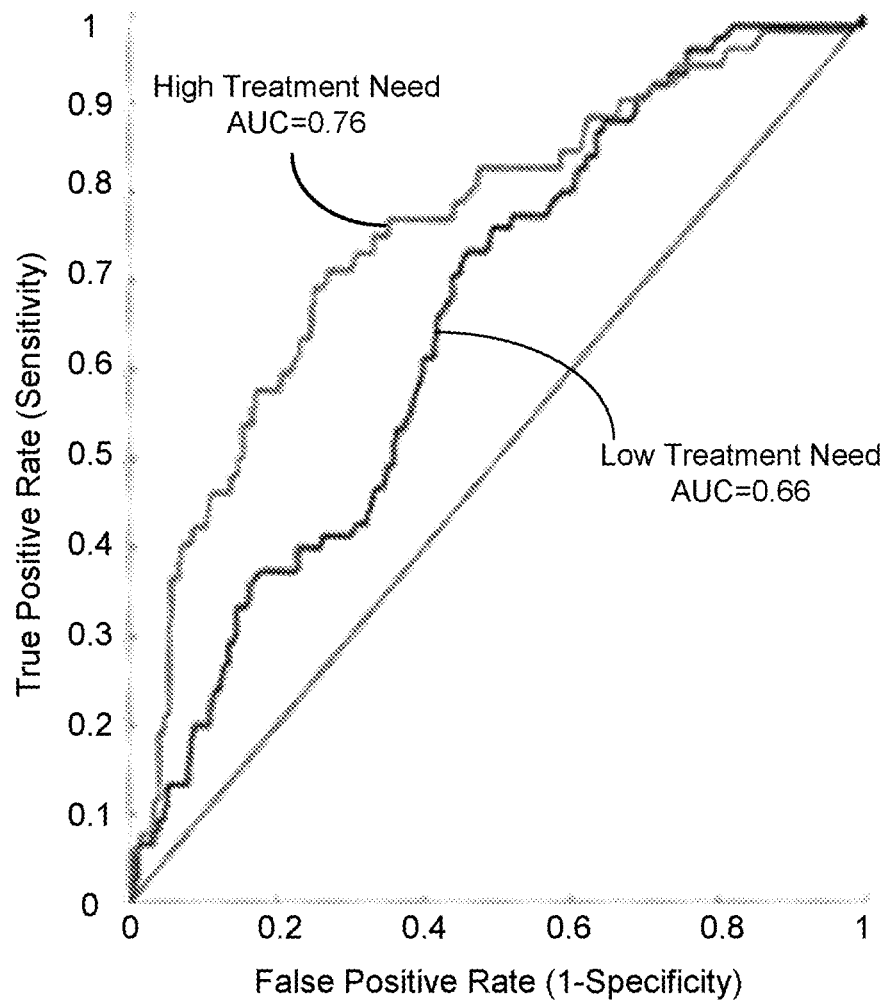
FIG. 7C shows ROCs characterizing the accuracy of treatment-intensity predictions (associated with a second label framework) generated by using a random-forest model to process OCT images.

FIGS. 7A-7B show ROCs characterizing the accuracy of predictions using the second Turing-framework labels. FIG. 7A characterizes accuracy of predictions as to whether a given eye-subject pair will have a high anti-VEGF treatment (as defined using the second Turing framework). The average AUROC was 0.73, and the aggregated AUROC was 0.75 (calculated via 10-fold cross-validation). FIG. 7B characterizes accuracy of predictions as to whether a given eye-subject pair will have a low anti-VEGF treatment (as defined using the second Turing framework). The average AUROC was 0.69, and the aggregated AUROC was 0.69 (calculated via 10-fold cross-validation). FIG. 7C shows the receiver operator curves for high and low treatment predictions using a random forest model on extracted features. As shown, the AUROC for predicting high and low treatments were 0.76 and 0.66, respectively—both being lower than those corresponding to the predictions from the dense neural network technique (pertaining to the data in FIG. 7A-7B).

A summary of end-to-end performance comparisons using different metrics and prediction techniques is shown in Table 1.

TABLE 1

|  |  | High Tx Burden vs Other Bench* | Low Tx Buren vs Other Bench |
|---|---|---|---|
| MUV criteria (21 tx m3-m23, H/L = 16/5, n = 352, H-vs-o 81:271, L-vs-o 79:273, 1042 scans) | 5-fold CV | 76.1% (70.1%-82.1%) | 78.6% (72.7%-84.4%) |
|  | MCCV (10 iter, 85:15 split) | 75.8% (69.4%-82.3%) | 76.8% (70.4%-83.3%) |
|  | MUV IOVS (10-fold CV) | 77% | 70% |
| Proj Turing criteria (10 tx m3-m12, H/L = 9/2, n = 424, H-vs-o 74:350, L-Vs-o 80:344, 1252 scans) | 5-fold CV | 74.5% (68.7%-80.9%) | 68.5% (62.0%-75.0%) |
|  | MCCV (10 iter, 85:15 split) | 77.6% (71.8%-83.5%) | 69.4% (62.6%-76.3%) |
|  | MUV ARVO | 76% | 66% |

VI.C. Conclusions

The deep-learning model continued to exhibit strong performance when evaluating predictions of post-loading-phase anti-VEGF treatments (in terms of predicting a frequency of treatment administration based on processing of a baseline OCT image) using validation data or hold-out data. Performance metrics remained strong even when using different types of performance metrics. Further, performance exceeded that output from other techniques for predicting anti-VEGF treatments.

VII. Additional Considerations

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification, and variation of the concepts herein disclosed may be resorted to by those skilled in the art, and that such modifications and variations are considered to be within the scope of this invention as defined by the appended claims.

The present description provides preferred exemplary embodiments only, and is not intended to limit the scope, applicability or configuration of the disclosure. Rather, the present description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the present description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

What is claimed is:

1. A method comprising:
   accessing an optical coherence tomography (OCT) image that corresponds to an eye of a subject experiencing age-related macular degeneration;
   identifying, within the OCT image, a set of pixels that correspond to a retina layer;
   flattening the OCT image based on the set of pixels;
   generating a plurality of patches using the flattened OCT image, wherein generating the plurality of patches comprises:
      performing one or more cropping processes using the flattened OCT image to produce one or more cropped images; and
      extracting the plurality of patches from the one or more cropped images;
         wherein the plurality of patches comprises patches having a plurality of sizes;
   inputting the plurality of patches into a plurality of a patch-specific neural networks;
      wherein each patch-specific neural network has been trained, on training patches having a specific size, to predict an effective characteristic of a treatment schedule; and
      wherein the plurality of patches is input, based on the size of each patch, to the plurality of patch-specific neural networks;
   generating, by the plurality of a patch-specific neural networks, a plurality of patch-specific outputs;
      wherein each plurality of patch-specific outputs corresponds to the respective one of the plurality of patches; and
      wherein each output of the plurality of patch-specific outputs predicts an effective characteristic of a proposed treatment schedule for the eye of the subject;
   weighting, by an integrating neural network that has learned a weighting relationship, the plurality of patch-specific outputs; and
   generating, by the integrating neural network and based on the weighted plurality of patch-specific outputs, a label corresponding to the characteristic of the proposed treatment schedule for the eye of the subject; and outputting the label.

2. The method of claim 1,
wherein outputting the label comprises outputting the label either at or to a client device for use in administering an anti-vascular endothelial growth factor (VEGF) treatment to the eye of the subject according to the proposed treatment schedule; and
wherein the label is indicative of a frequency of treatment administration predicted to be sufficiently effective such that fluid does not leak from vessels in the eye between successive treatment administration.

3. The method of claim 1, wherein the characteristic of the proposed treatment schedule indicates an interval between successive administrations of a treatment.

4. The method of claim 1, wherein the retina layer includes a retina pigment epithelium layer.

5. The method of claim 1,
wherein the label identifies the eye of the subject as an eye predicted to be effectively treated by the characteristic of the proposed treatment schedule and based on the weighted plurality of patch-specific outputs that is generated by the integrating neural network;
wherein the characteristic of the proposed treatment schedule comprises an interval between successive administrations of an anti-vascular endothelial growth factor (aVEGF) treatment; and
wherein the method further comprises administering the aVEGF treatment to the eye of the subject according to the proposed treatment schedule.

6. The method of claim 1, wherein the weighting relationship comprises applying a weight to a patch-specific output based on the patch-specific neural network that generated the patch-specific output.

7. The method of claim 1, wherein the weighting relationship comprises applying a weight to each patch-specific output based on the other path-specific outputs.

8. A system comprising:
one or more data processors; and
a non-transitory computer readable storage medium containing instructions which, when executed on the one or more data processors, cause the one or more data processors to perform a set of actions including:
accessing an optical coherence tomography (OCT) image that corresponds to an eye of a subject experiencing age-related macular degeneration;
identifying, within the OCT image, a set of pixels that correspond to a retina layer;
flattening the OCT image based on the set of pixels;
generating a plurality of patches using the flattened OCT image, wherein generating the plurality of patches comprises:
performing one or more cropping processes using the flattened OCT image to produce one or more cropped images; and
extracting the plurality of patches from the one or more cropped images;
wherein the plurality of patches comprises patches having a plurality of sizes;
inputting the plurality of patches into a plurality of a patch-specific neural networks;
wherein each patch-specific neural network has been trained, on training patches having a specific size, to predict an effective characteristic of a treatment schedule; and
wherein the plurality of patches is input, based on the size of each patch, to the plurality of patch-specific neural networks;
generating, by the plurality of a patch-specific neural networks, a plurality of patch-specific outputs;
wherein each plurality of patch-specific outputs corresponds to the respective one of the plurality of patches; and
wherein each output of the plurality of patch-specific outputs predicts an effective characteristic of a proposed treatment schedule for the eye of the subject;
weighting, by an integrating neural network that has learned a weighting relationship, the plurality of patch-specific outputs; and
generating, by the integrating neural network and based on the weighted plurality of patch-specific outputs, a label corresponding to the characteristic of the proposed treatment schedule for the eye of the subject; and
outputting the label.

9. The system of claim 8,
wherein outputting the label comprises outputting the label either at or to a client device for use in administering an anti-vascular endothelial growth factor (VEGF) treatment to the eye of the subject according to the proposed treatment schedule; and
wherein the label is indicative of a frequency of treatment administrations predicted to be sufficiently effective such that fluid does not leak from vessels in the eye between successive treatment administrations.

10. The system of claim 8, wherein the characteristic of the proposed treatment schedule indicates an interval between successive administrations of a treatment.

11. The system of claim 8, wherein the retina layer includes a retina pigment epithelium layer.

12. The system of claim 8, wherein the proposed treatment schedule includes a proposed schedule for administering anti-vascular endothelial growth factor.

13. The system of claim 8, wherein the weighting relationship comprises applying a weight to a patch-specific output based on the patch-specific neural network that generated the patch-specific output.

14. The system of claim 8, wherein the weighting relationship comprises applying a weight to each patch-specific output based on the other path-specific outputs.

15. A computer-program product tangibly embodied in a non-transitory machine-readable storage medium, including instructions configured to cause one or more data processors to perform a set of actions including:
accessing an optical coherence tomography (OCT) image that corresponds to an eye of a subject experiencing age-related macular degeneration;
identifying, within the OCT image, a set of pixels that correspond to a retina layer;
flattening the OCT image based on the set of pixels;
generating a plurality of patches using the flattened OCT image, wherein generating the plurality of patches comprises:
performing one or more cropping processes using the flattened OCT image to produce one or more cropped images; and
extracting the plurality of patches from the one or more cropped images;
wherein the plurality of patches comprises patches having a plurality of sizes;
inputting the plurality of patches into a plurality of a patch-specific neural networks;

wherein each patch-specific neural network has been trained, on training patches having a specific size, to predict an effective characteristic of a treatment schedule; and wherein the plurality of patches is input, based on the size of each patch, to the plurality of patch-specific neural networks;

generating, by the plurality of a patch-specific neural networks, a plurality of patch-specific outputs;

wherein each plurality of patch-specific outputs corresponds to the respective one of the plurality of patches; and wherein each output of the plurality of patch-specific outputs predicts an effective characteristic of a proposed treatment schedule for the eye of the subject;

weighting, by an integrating neural network that has learned a weighting relationship, the plurality of patch-specific outputs; and generating, by the integrating neural network and based on the weighted plurality of patch-specific outputs, a label corresponding to the characteristic of the proposed treatment schedule for the eye of the subject; and outputting the label.

16. The computer-program product of claim 15, wherein outputting the label comprises outputting the label either at or to a client device for use in administering an anti-vascular endothelial growth factor (VEGF) treatment to the eye of the subject according to the proposed treatment schedule; and wherein the label is indicative of a frequency of treatment administrations or an interval between successive treatment administrations predicted to be sufficiently effective such that fluid does not leak from vessels in the eye between successive treatment administrations.

17. The computer-program product of claim 15, wherein the weighting relationship comprises applying a weight to a patch-specific output based on the patch-specific neural network that generated the patch-specific output.

18. The computer-program product of claim 15, wherein the weighting relationship comprises applying a weight to each patch-specific output based on the other path-specific outputs.

* * * * *